United States Patent [19]

Goodman

[11] 4,162,119
[45] Jul. 24, 1979

[54] FIBER OPTIC POSITION INDICATOR

[75] Inventor: David S. Goodman, Mission Viejo, Calif.

[73] Assignee: International Telephone and Telegraph Corporation, New York, N.Y.

[21] Appl. No.: 852,859

[22] Filed: Nov. 18, 1977

[51] Int. Cl.² ............................................. G02B 5/14
[52] U.S. Cl. ................................................ 350/96.21
[58] Field of Search ............... 350/96.20, 96.21, 96.22; 362/32; 250/227

[56] References Cited

U.S. PATENT DOCUMENTS

| 2,825,896 | 3/1958 | Schellman et al. | 340/252 |
|---|---|---|---|
| 3,594,767 | 7/1971 | Link | 340/253 |
| 3,638,008 | 1/1972 | Keller et al. | 350/96.20 |
| 3,683,167 | 8/1972 | Rishton | 350/96.20 |
| 3,755,661 | 8/1973 | Bouvrando | 240/2 S |
| 3,916,133 | 10/1975 | Bollinger, Jr. et al. | 200/308 |
| 4,069,403 | 1/1978 | Beaudette et al. | 200/51.12 |

FOREIGN PATENT DOCUMENTS 2708369  9/1977  Fed. Rep. of Germany ........ 350/96.21

OTHER PUBLICATIONS

Bedgood et al., *Electrical Communication*, vol. 51, No. 2, Feb. 1976, Demountable Connectors for Optical Fiber Systems.

*Primary Examiner*—John K. Corbin
*Assistant Examiner*—Stewart Levy
*Attorney, Agent, or Firm*—William T. O'Neil

[57] ABSTRACT

A fiber optic device for providing a visual indication when a subassembly, such as an electronic "ATR box", is in place in a rack mounting arrangement with its electrical connections firmly mated with the corresponding rack connections within a small predetermined tolerance. A special fiber optic connector has first and second parts, one of which is attached to the ATR box and the other mounting in the rack for mating concurrently with the mating of the electrical connections. A number of such devices may be provided in a rack of equipment, each fixed rack mounted connector being supplied with a light signal via a length of fiber optic conductor, preferably from a common light source. Within the ATR box unit itself, another length of fiber optic conductor connects the fiber optic connector to the front panel or some other location for convenient observation. In one of the mating connector parts, a slit diaphragm prevents any appreciable transfer of light between the optical fibers of the connector parts until said diaphragm is penetrated and deflected by the opposing optical fiber during the last relatively small increment of movement into the mating operation.

15 Claims, 4 Drawing Figures

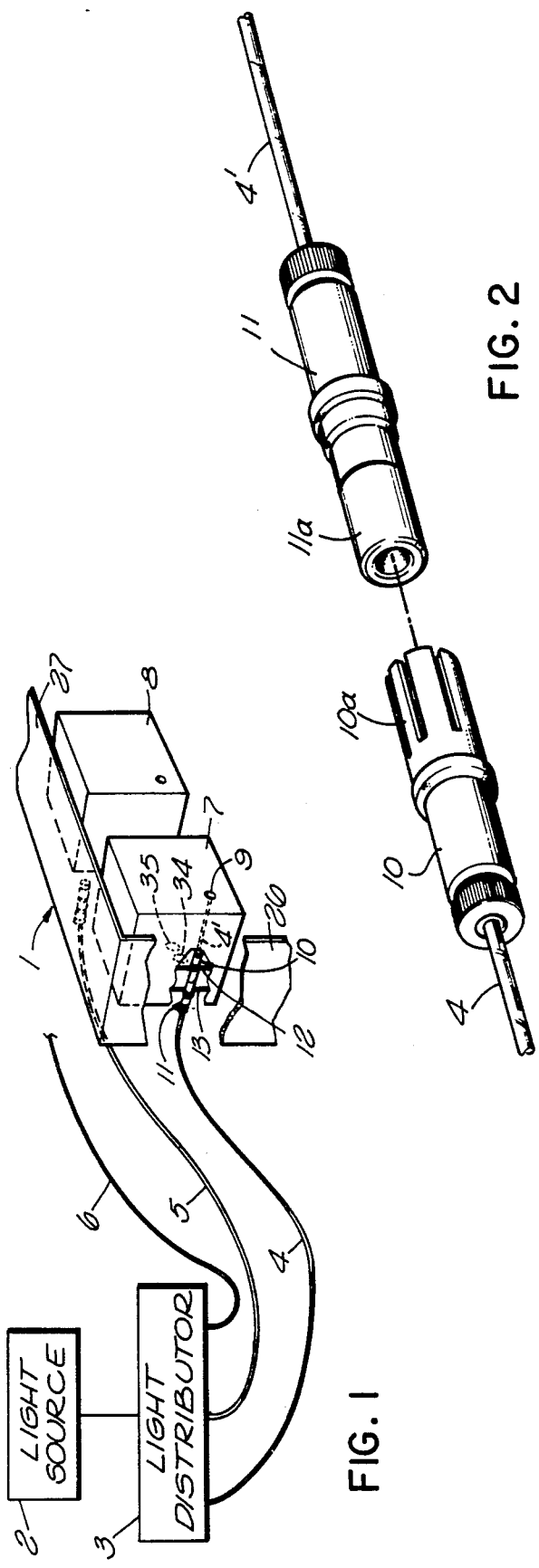
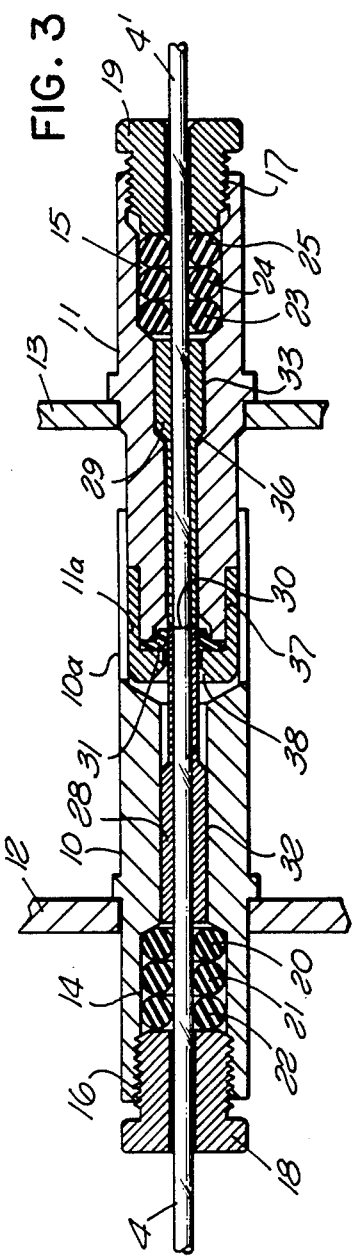
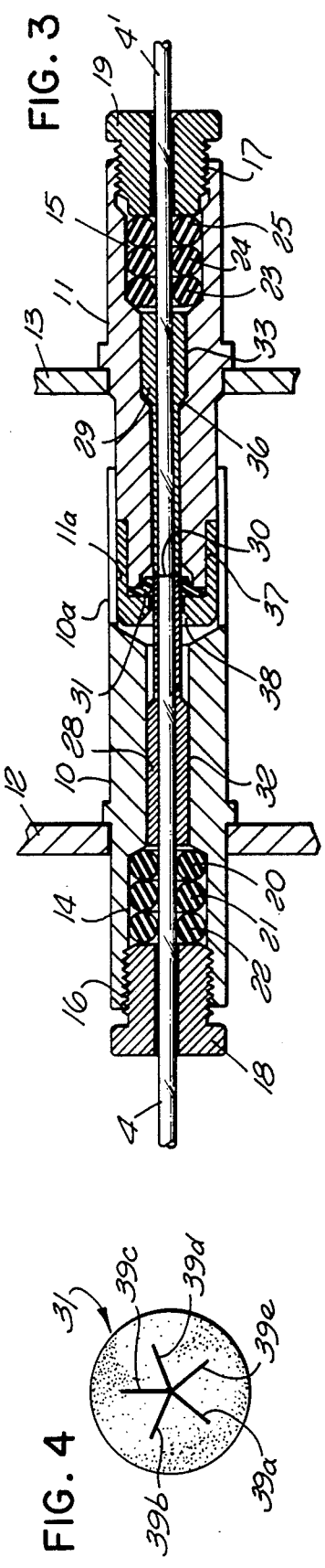
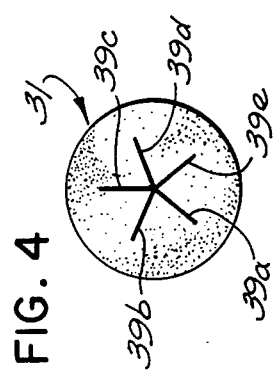

FIBER OPTIC POSITION INDICATOR

BACKGROUND OF THE INVENTION

1. Field of the Invention

The invention relates to the field of interlocks and position indicators, particularly those employing optical techniques.

2. Description of the Prior Art

In the prior art, a number of situations exist in which it is desired to confirm, visually or otherwise, the engagement or placement of a subassembly or unit in a rack or mounting arrangement. Typical of such a requirement is the commercial airliner situation in which a standardized rack mounts and provides for the connection of various electronic subassemblies such as radio communication and intercom equipment, navigation equipment, and the like.

The commercial airlines, through an industry-owned organization called "ARINC" have established so-called ATR standards for unit sizes, standardized electrical connections and mounting interface hardware. The term, LRU, refers to the lowest or least (smallest) replaceable unit in such an arrangement. When these LRUs are installed in an equipment rack, or removed and replaced for any reason, it is important that there be some readily identifiable indication that the unit is indeed fully and completely in place, so that the electrical connection of the subassembly are reliably mated to corresponding fixed connections in the mounting arrangement. Such arrangements for that assurance have sometimes been called "interlocks".

An interlock, or position-indicating arrangement or device, can obviously be provided by a mechanical means and also can be purely electrical, i.e., in which an electric switch is actuated or deactuated when the unit is slid into place. Reliability and cost considerations are obviously important. Purely mechanical devices are relatively expensive and are subject to wear, maladjustment or outright malfunction. Electric switches under all circumstances including shock and vibration and other adverse environmental factors leave much to be desired from the point of view of reliability and fail-safety.

In electrical systems, there is always some inherent fire and explosion hazard in addition to the other problems aforementioned.

The manner in which the present invention deals with the disadvantages of prior art approaches to the problem of reliable electrical subassembly engagement indication will be understood as this description proceeds.

SUMMARY

It may be said to have been the general objective of the present invention to provide a position or engagement indicator for use in applications of the type hereinbefore described, such device being inexpensive, reliable, fail-safe, free of fire and explosion hazards, and inexpensive to manufacture.

In the typical electronic equipment rack, such as that in accordance with ATR standards, a plurality of individual subassemblies comprising such devices as radio transmitters and receivers, electronic navigational equipment, autopilot control devices and the like are individually installed and individually and discretely removable from their rack positions. During installation or replacement, a sliding or translational motion toward the back of the rack effects mating or engagement of the electrical connectors on the removable or replaceable unit with those on the rack or mounting structure. Suitable guide rails are, of course, involved.

The present invention contemplates the placement of the halves of a fiber optic connector assembly in mating relationship (i.e., one affixed to the rack structure and the other to the removable subassembly). The fiber optic connector employed in the combination of the present invention is unique of itself, although it does rely on some prior art structures and techniques in the fiber optic connector art. The novel features of the connector structure will be understood and appreciated as this description proceeds.

In particular, a relatively opaque, flexible slit diaphragm is installed in one of the fiber optic connector halves which may be thought of as the receptacle and acts as shuttering means. This flexible diaphragm substantially shields the end of the optic fiber axially adjacent to it from light transmission. When the other connector, which is mounted on the removable subassembly, is mated to its receptacle connector, an opposing protruding optical fiber member thereon penetrates the diaphragm and comes into substantial abutment with the optical fiber of the rack-mounted, receptacle-type connector member.

The system of the invention may be employed with only a single rack position and corresponding removable subassembly, however, it is anticipated that all rack positions in a given mounting arrangement would be equipped with the fiber optical receptacle connector members disposed to be engaged to the connector mating member corresponding to each removable subassembly for each such position in the rack, Each of these receptacle connectors is energized by a light signal conducted through its associated fiber optic cable from a light source which preferably also includes a distributor for substantially equalizing the light intensity in each of these fiber optic cables.

The pin-type connector member associated with removable subassembly as aforementioned has an associated fiber optic cable leading to a position on the subassembly, such as its front panel, from where the illumination resulting from substantially complete engagement of the subassembly into the rack connectors can be confirmed visually.

The details of the structure and other aspects of the system according to the present invention will be evident as this description proceeds.

BRIEF DESCRIPTION OF THE DRAWINGS

FIG. 1 is a semi-pictorial type drawing of a typical arrangement according to the invention.

FIG. 2 is a pictorial of a pair of typical matable fiber optic connector elements adapted to the arrangement of FIG. 1.

FIG. 3 is a cross-sectional view of the connector elements of FIG. 2 in the mated condition according to FIG. 1.

FIG. 4 depicts the flexible iris (slit diaphragm) also shown in FIG. 3.

DESCRIPTION OF THE PREFERRED EMBODIMENT

Referring now to FIG. 1, a typical rack-mounting arrangement 1 is depicted showing a typical pair of removable/replaceable subassemblies 7 and 8. Numerals 34 and 35 represent assumed typical locations for electrical connectors with subassembly 7, these connectors comprising fixed rack-mounted connector sockets and subassembly-mounted mating pin-type connectors, for example. As a unit is installed or removed, these connections are automatically made or broken, respectively. A corresponding pair of fiber optic connector mating units 10 and 11 is shown, 10 being carried by the subassembly 7 and 11 being the rack-mounted counterpart. The mating of these parts 10 and 11 will be described in more detail hereinafter, but for the sake of FIG. 1, it is sufficient to point out that fiber optic connector 10 mates into 11 as the electrical connectors at locations 24 and 35 are mated. Each rack-mounted fiber optic connectors, such as 11, has an associated fiber optic conductor or cable (element), namely that represented at 4, in connection with 11. Cables 5 and 6 represent two additional fiber optic conductors for other subassemblies in the rack arrangement, it being understood that ordinarily there would be many more.

FIG. 2 is a light source and FIG. 3 is a light distributor which divides the illumination from 2, more or less uniformly, among all the optical fibers taking their light input from 3, such as 4, 5, and 6, etc.

Typically, a length of fiber optic conductor 4' extends from the connector 10 to the front panel to subassembly 7. Here it is readily observed visually at 9. It is to be understood that a colored or other lens may be installed at 9 in order to enhance the observability of light eminating from 9. A typical second pair of fiber optic connectors, generally at 27 and associated with subassembly 8 in the same way, is shown in FIG. 1. The numeral 26 generally represents slide rails or the like to guide subassembly 7 into place as it is installed. This ensures that the mating and disengagement of electrical and fiber optic connectors is the result of a straight translational movement devoid of rotation or lateral components of motion insofar as possible.

Referring now to FIG. 2, a typical pair of mating fiber optic parts suitable for employment in FIG. 1, shows connector parts 10 and 11 in pictorial detail, with associated fiber optic cables 4 and 4', respectively. If 10 is generally referred to as the pin body, and 11 the socket or receptacle body, it is to be understood that this refers to the fiber optic elements within each 10 and 11, however, from the connector shell or housing point of view, 10 might also be referred to as a socket body and 11 the pin body since the split end portion 10a receives the solid extension 11a of 11. Fiber optic conductors 4 and 4' are shown for correspondence to FIG. 1, it being understood, of course, that the additional fiber optic connector pair such as generally shown at 27 in FIG. 1, and all others in a given arrangement would typically be identically arranged.

Referring now to FIG. 3, fiber optic connector parts 10 and 11 are shown in their fully mated condition in which the optical fiber 4 associated with 10 is fully interfaced at 30 with the fiber optic conductor 4' associated with 11. The nose 11a is shown inserted into 10a, this corresponding to essentially a full mating of 10 and 11 and of the respective subassembly into the corresponding rack position. The sectioned panels 12 and 13 represent corresponding typical structural members in 7 and the rack 1, respectively, although it should be understood that the converse arrangement is readily possible. Also, the manner in which 10 and 11 are anchored to the respective subassembly and rack structure are subject to much variation within the realm of ordinary mechanical skill, and the representation of FIG. 3 in that regard is to be considered as suggestive only.

The connector body 10 will be seen to contain two axial bores in addition to the socket space within 10a, these being 14 and 32. Bore 14 is the larger of the two and contains an internally threaded portion 16 engaging corresponding threads on gland nut 18. A gland seal is comprised of O-ring parts 20, 21 and 22, which are made of a resilient plastic or rubber-like material having a suitable bulk modulus. An axial bore 18a through the gland nut 18 and through which the fiber optic element 4 passes is understood to be a clearance hole with respect to the outside diameter of 4. Advancement of the gland nut 18 compresses the gland seal members causing them to firmly grip the fiber optic element 4.

The same basic arrangement pertains in respect to connector part 11, i.e., that it has a gland nut 19 threading into the threaded portion of internal bore 15 at 17, likewise capable of being advanced to compress the gland seal provided by O-rings 23, 24 and 25 to grip the optic fiber 4', holding it in place axially.

Both optical fiber elements (namely, 4 and 4') are protected by typical termination pins or ferrule members 28 and 29, respectively. These members protect the optical fibers against breakage or mechanical damage and are common in the fiber optic connector art, such termination pins or ferrules are shown in the prior art, for example, in U.S. Pat. Nos. 3,914,015 and 3,947,182.

Unlike the bore 32, bore 33 is partially bottomed at 36, and it is intended that the presetting of gland nut 19 during manufacture should establish the interface point 30, i.e., the leftmost extremity of the optic fiber 4'. In this way, the flexible diaphragm 31 is held in place about its outer perimeter by the nose piece 11a which is firmly attached to connector body 11 along the press-fit interface 37.

It will be realized that typical fiber optic conductors or cables, even if composed of a number of paralleled strands of optical fiber, are relatively small in size (diameter). Thus, the showing of FIG. 3 will be recognized as exaggerated in size, this being necessary for clarity of description.

Of course, rather than being a press-fit, the interface 37 might be a threaded engagement or other type of joint. The extremity of the nose piece 11a also includes a concentric bore chamfered at 38 for guidance of the extremity of the termination pin 28 containing optical fiber 4.

At this point, it is desirable to also consider FIG. 4. Here, the flexible (slit) diaphragm is shown in its flat axially viewed form in order to have a clear understanding of its construction. Essentially, it is a disc of a resilient flexible material as aforementioned, containing slits 39a–39e producing a plurality of radially inwardly extending fingers which are readily parted by passage of 28 therethrough. Since, as hereinbefore indicated, the actual sizes of the components represented in FIG. 3 are considerably smaller than illustrated, the axially measured distance between initial engagement of 28 against 29 and full engagement of 29 against the interface 30 is relatively small. It will be realized that some light transmission will occur between 4 and 4' as the diaphragm 31 is penetrated but before 29 reaches the interface 30. Good design in this regard would indicate that this final engagement distance from initial penetration of 31 to the full engagement at interface 30 should represent a range of acceptable degrees of mating of the electronic subassembly (7, for example) into the rack 1 (FIG. 1) so that the electrical connectors at 34 and 35 are satisfactorily mated over that range.

As an installation adjustment, for the selection of the on/off sequence, gland nut 18 may be backed off, freeing the optical fiber 4 to be positioned axially so that the penetration of the diaphragm 31 occurs during the final axial increment of electrical connector engagement (for example, 0.15 to 0.02 inches approximately).

Suitable materials for the connector halves and their integral parts are well known in the fiber optic connector art. Still further, there are a number of possibilities for the construction of the light distributor 3 illustrated in FIG. 1. The arrangement shown in U.S. Pat. No. 3,638,008 is one suitable arrangement for 3 of FIG. 1. Actually, 2 and 3 of FIG. 1 would be combined in such an arrangement.

It will be evident, of course, that individual light sources at the alignment locations within the rack 1 could be used. However, such a change would detract from the basic reliability and convenience of the preferred embodiment herein described. With the single light source and fiber optic conductors therefrom, as shown and described, the possibility of failure of the light source can be ruled out in respect to the mating of an individual electronic subassembly to the rack if the fully mated light indication on the panel of the electronic assembly is not observed while the same indications for others of the subassemblies are evident.

Although the structure described in the overall sense involves a fixed rack position and a movable subassembly, it will be readily evident that two portable or separately movable "black box" devices could employ the same structure for the same purpose with a minimum of adaptation, to confirm an electrical or even an entirely mechanical "mate-up".

Various other design modifications are possible within the spirit of the present invention and, accordingly, it is not intended that the scope of the invention should be considered limited by the drawings or this description, these being intended to be typical and illustrative only.

What is claimed is:

1. A device for indicating the connected-in-place condition of a physically removable subassembly having electrical connections intended to make and disengage with and from fixed electrical connections in a mounting arrangement in response to corresponding translational movements, comprising;

a first fiber optic light conducting element mounted in substantially fixed relationship with said removable subassembly, said element having a first end arranged with respect to a part of said removable subassembly to facilitate visual observation of light emitted therefrom when said device is in said connected-in-place condition in said mounting arrangement, the second end of said element being oriented to receive light from an external point along a light path substantially parallel to said translational movements when said subassembly is in said connected-in-place condition;

second means comprising a source of light and means fixed with respect to said mounting arrangement for directing light along said parallel path from a fixed location aligned with said first fiber optic element second end;

and third means operative as a function of the axial spacing along said parallel path between said fixed location and said fiber optic element first end to prevent substantial light transmission through said optical spacing when said axial spacing is less than a predetermined amount corresponding to said connected-in-place condition of said subassembly, and otherwise to permit light transfer between said first fiber optic element and said second means.

2. A device according to claim 1 in which said second means includes a second fiber optic light-conducting element connected at a first end to said light source, the second end of said second fiber optic element being placed at said aligned location.

3. A device according to claim 2 in which said mounting arrangement comprises a plurality of positions each having corresponding fixed electrical connections for receiving a corresponding plurality of removable subassemblies and in which each of said positions has a corresponding one of said aligned locations at which a corresponding second fiber optic element terminates, and in which the corresponding plurality of second fiber optic elements thereby provided are responsive to said source of light at their first ends.

4. A device according to claim 1 in which said third means comprises a flexible, substantially opaque diaphragm placed in said light path a relatively small predetermined distance from said second end of said second fiber optic element, said diaphragm being adapted to admit said first fiber optic element at said second end thereof, thereby to establish continuity of light transmission between said first and second fiber optic elements beginning as said translational movement during said mating reaches said diaphragm and deflects it sufficiently to establish said continuity of light.

5. A device according to claim 2 in which said third means comprises a flexible, substantially opaque slit diaphragm placed in said light path a relatively small predetermined distance from said second end of said second fiber optic element, said diaphragm being adapted to admit said first fiber optic element at said second end thereof, thereby to establish continuity of light transmission between said first and second fiber optic elements beginning as said translational movement during said mating reaches said diaphragm and deflects it sufficiently to establish said continuity of light.

6. Apparatus according to claim 3 in which said ight source includes means for transmitting of light of substantially the same intensity into each of said plural second fiber optic element first ends.

7. Apparatus according to claim 2 further comprising first and second mating fiber optic connector bodies housing the communicating ends of said first and second fiber optic elements, respectively, said first connector body being mechanically fixed at said removable subassembly and said second connector body being mechanically fixed at said aligned location associated with said mounting arrangement, said connector bodies mating concurrently with mating of said subassembly and fixed electrical connections to bring said fiber optic members into light-transmitting relationship.

8. Apparatus according to claim 4 further comprising first and second mating fiber optic connector bodies housing the communicating ends of said first and second fiber optic elements, respectively, said first connector body being mechanically fixed at said removable subassembly and said second connector body being mechanically fixed at said aligned location associated with said mounting arrangement, said connector bodies mating concurrently with mating of said subassembly and fixed electrical connections to bring said fiber optic members into light-transmitting relationship.

9. Apparatus according to claim 7 in which said connector bodies have axial bores for receiving said corresponding fiber optic elements and lateral alignment means operative during said mating, in which said bodies each has an enlarged diameter bore with an internally threaded portion and a gland nut engaging said threads at its nonmating end, and in which a gland seal arrangement holds said optical fiber elements in concentricity within said bodies.

10. Apparatus according to claim 9 in which said flexible diaphragm is mounted within the one of said bodies containing said second fiber optic element adjacent its mating end, said gland seal exerting axial force for position adjustment of said fiber optic element within the corresponding gland nut to establish said relatively small predetermined distance of said iris from said second fiber optic element.

11. A connector structure for fiber optic cables comprising:
   a socket body housing and holding an end of a first fiber optic cable in generally axial position within said body;
   a pin body housing and holding an end of a second fiber optic cable in an axially protruding position, said pin and socket bodies being matable to bring about abutment of said cable ends in a light-transmitting relationship;
   and resilient shuttering means associated with said socket body and interposed between said cable ends for preventing the establishment of said light-transmitting relationship until said end of said second fiber optic cable penetrates said shuttering means corresponding to a predetermined degree of axial mating of said pin and socket bodies.

12. Apparatus according to claim 11 in which said shuttering means includes a substantially opaque slit diaphragm of resilient material.

13. Apparatus according to claim 12 in which said resilient material is a polymer having relatively rapid resilient recovery characteristics.

14. Apparatus according to claim 12 in which said resilient material is one selected from the group of the flexible relatively soft materials including rubber, synthetic rubbers and soft plastics.

15. Apparatus according to claim 12 in which said diaphragm is generally disc shaped and said slits are at least three in number extending radially outward from the center of said disc and are substantially uniformly spaced angularly about said center.

* * * * *